J. H. ALEXANDER.
TRAP.
APPLICATION FILED FEB. 18, 1916.

1,266,751.

Patented May 21, 1918.

Witnesses
C A Beall

Inventor
J. H. Alexander
By
Attorney

UNITED STATES PATENT OFFICE.

JAMES H. ALEXANDER, OF CONQUEST, KANSAS.

TRAP.

1,266,751.　　　　　Specification of Letters Patent.　　Patented May 21, 1918.

Application filed February 18, 1916. Serial No. 79,145.

*To all whom it may concern:*

Be it known that I, JAMES H. ALEXANDER, a citizen of the United States, residing at Conquest, in the county of Kearny and State of Kansas, have invented certain new and useful Improvements in Traps; and I do hereby declare the following to be a full, clear, and exact description of the invention, such as will enable others skilled in the art to which it appertains to make and use the same.

This invention relates to new and useful improvements in traps and the principal object is to provide an animal trap which is released by an attempt of the animal to remove the bait from the hook.

Another object of the invention is to provide a trap in which the jaws are so constructed as to avoid the possibility of injuring the fur of the animal.

A still further object of the invention is to provide a novel tripping means for traps which may be easily tripped to release the jaws and permit the same to swing closed under influence of the springs.

With these and other objects in view, the invention consists in the novel combination and arrangement of parts which will be fully set forth in the following specification and accompanying drawings, in which:—

Figure 1:
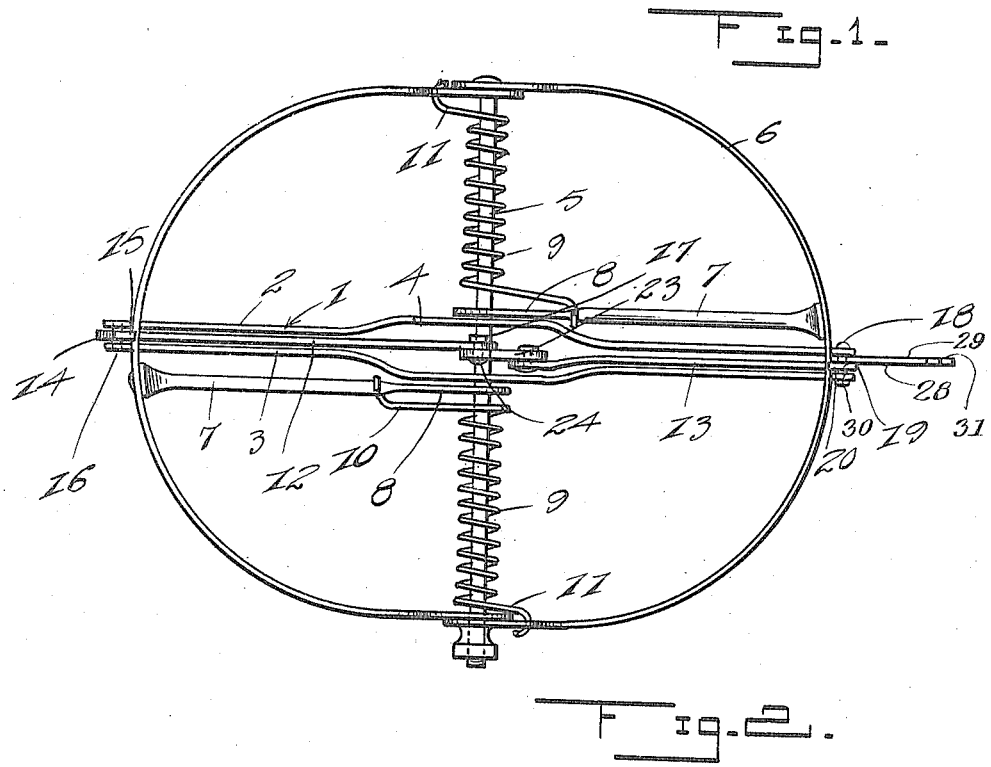
Figure 1 is a top plan view of a trap constructed in accordance with this invention showing the same in its set position.

Referring to the drawings by characters of reference the numeral 1 designates as an entirety the frame of the trap comprising the bars 2 and 3 which are provided centrally with the outwardly offset portions 4. These offset portions are formed with central apertures through which the rod 5 extends on which the jaw members which will be more fully hereinafter described are pivoted. The jaw members hereinbefore referred to are designated by the numeral 6 and each comprises a substantially semi-circular body having apertures formed near opposite ends thereof which are adapted to aline and receive the pivot bolts or pins 5 to pivotally secure the jaws to the frame. Riveted or otherwise secured intermediate the ends of each of the jaws is an arm 7 which is provided near its opposite end with a flattened portion 8 having a transverse aperture extending therethrough for the reception of the pivot bolt. A torsional coil spring 9 surrounds the pivot bolt intermediate the frame and the opposite ends of the jaw members and each spring is formed with an arm 10 which engages around its respective arm 7 so as to tend to move the jaw toward the coöperating jaw. In order to further assist in this movement the opposite end of the spring is provided with an arm 11 for engaging the coöperating jaw so as to tend to move the jaws toward each other.

Figure 2:
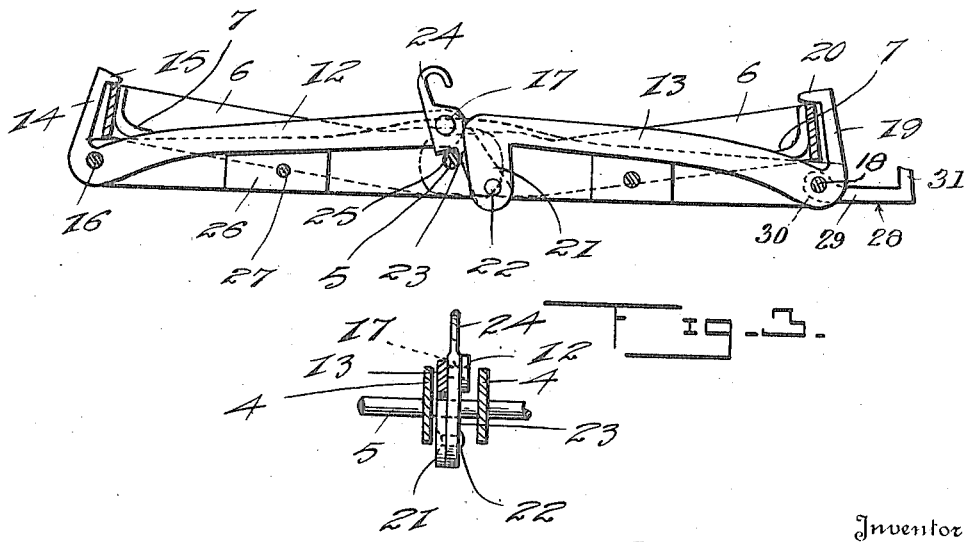
Fig. 2 is a longitudinal sectional view through the trap.
Figure 3:
Fig. 3 is a fragmentary transverse sectional view therethrough.

In order to hold the jaws apart, a suitable trip mechanism is provided which comprises a pair of coöperating links, one of which is designated by the numeral 12 while the opposite link is designated by the numeral 13. The link 12 is formed with an angularly extending arm 14 having the catch 15 at its upper end and is pivoted as at 16 between the bars 2 at one end of the frame 1. The opposite end of the link is provided with an aperture for the reception of the pivot pin 17, the use of which will appear as the description proceeds. The link 13 is pivoted as at 18 to the opposite end of the frame and is provided with the upwardly extending arm 19 having formed at its upper end the latch 20 while the opposite terminal of the bar 13 is provided with the downwardly extending portion 21 provided near its lower terminal with an aperture for the reception of the pivot pin 22 the use of which will appear as the description proceeds. Pivotally connected between the links 12 and 13 by means of the pivot pins 17 and 22 is the releasing link 23 which is formed at its upper end with the bait hook 24. This link is cut away as at 25 to accommodate the bolt 5 as clearly illustrated in Fig. 2.

The bars 2 and 3 are held in spaced parallel relation by suitable spacing blocks 26 and the rivets 27 extend through the spacing blocks and bars and hold the same in assembled position.

It will be apparent from the foregoing that in use the device is set by moving one of the jaw members downwardly against the frame and locking the same by the auxiliary lock 28 which comprises the lever 29 pivoted to one of the bars of the frame as at 30 which is provided at its upper end with a tooth 31. In locking the jaw it will be seen that the auxiliary lock is raised so that the tooth overhangs the inner face of the jaw and thereby holds the same downwardly. The coöperating jaw is then swung over against the force of the springs and upon reaching its downward limit of movement the link 23 is pushed downwardly, thereby causing the arms 12 and 13 to move downwardly and move the arms 14 and 19 inwardly so that the teeth 15 and 20 engage the jaw members and lock the same against movement. In this position it will be seen that when the animal attempts to move the bait from the bait hook 24, the arms 12 and 13 will be moved upwardly thereby releasing the jaws and permitting the trap to be sprung.

While in the foregoing there has been shown and described the preferred embodiment of this invention, it is to be understood that such changes may be made in the combination and arrangement of parts as will fall within the spirit and scope of the appended claims.

What is claimed is:—

A trap comprising a frame formed of a pair of parallel bars, said bars being spaced and provided centrally with outwardly offset portions, a transverse pivot bolt extending centrally through said bars and at right angles thereto, jaws pivoted to said pivot bolt, springs surrounding said pivot bolt on each side of said parallel bars and engaging said jaws to normally force said jaws toward each other, levers pivoted between the parallel bars of the frame at their opposite ends, the outer ends of said levers being provided with hooks for engaging the jaws, to hold the same against the tension of the springs, a link mounted above the transverse pivot bolt and between the outwardly offset portions of the parallel bars and pivotally connecting the inner ends of the levers, and a bait hook formed on the upper portion of the link as for the purpose specified.

In testimony whereof I affix my signature in presence of two witnesses.

JAMES H. ALEXANDER.

Witnesses:
ALONZO GALE,
MAX VAN HALL.

Copies of this patent may be obtained for five cents each, by addressing the "Commissioner of Patents, Washington, D. C."